Sept. 20, 1938.　　　　E. M. FLORCYK　　　　2,130,486
CLUTCH MECHANISM
Filed March 11, 1935　　　　4 Sheets-Sheet 2
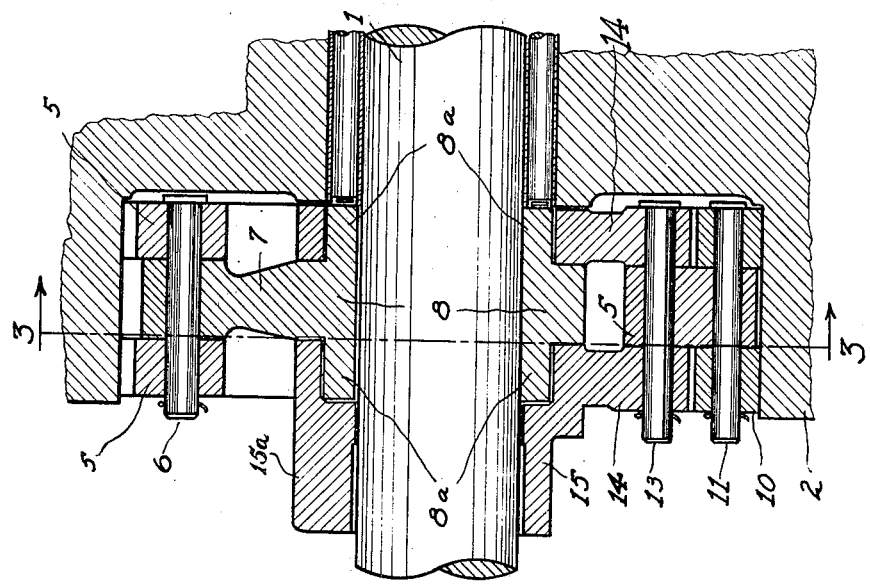
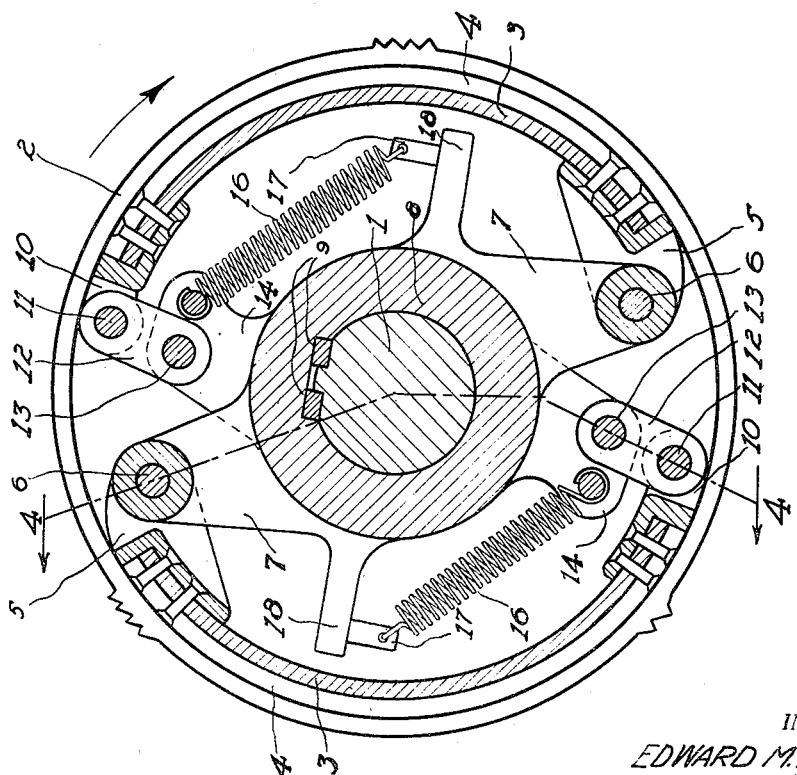
INVENTOR.
EDWARD M. FLORCYK
BY
Blair, Curtis & Dunne
ATTORNEYS.

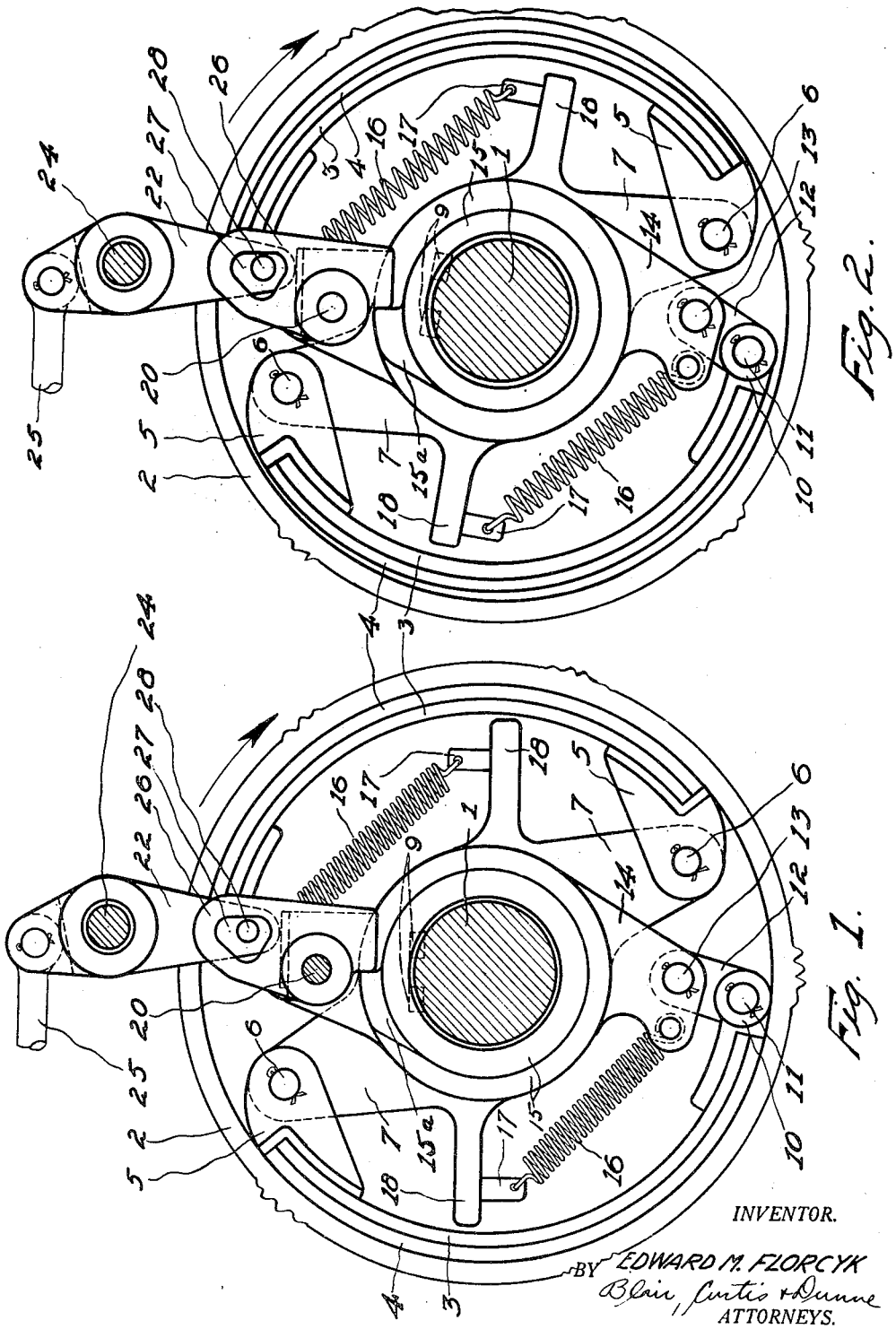

Sept. 20, 1938.  E. M. FLORCYK  2,130,486
CLUTCH MECHANISM
Filed March 11, 1935  4 Sheets-Sheet 3
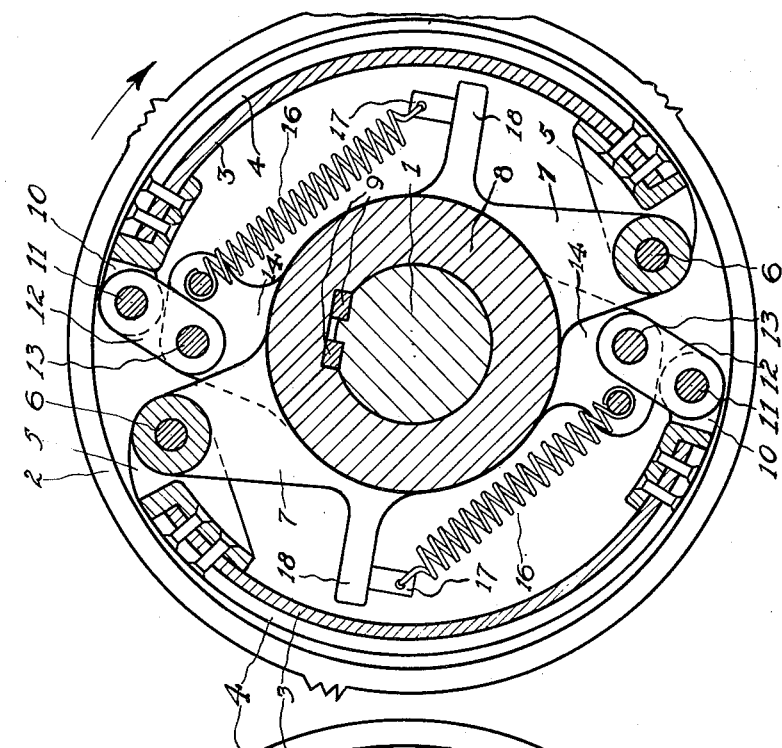
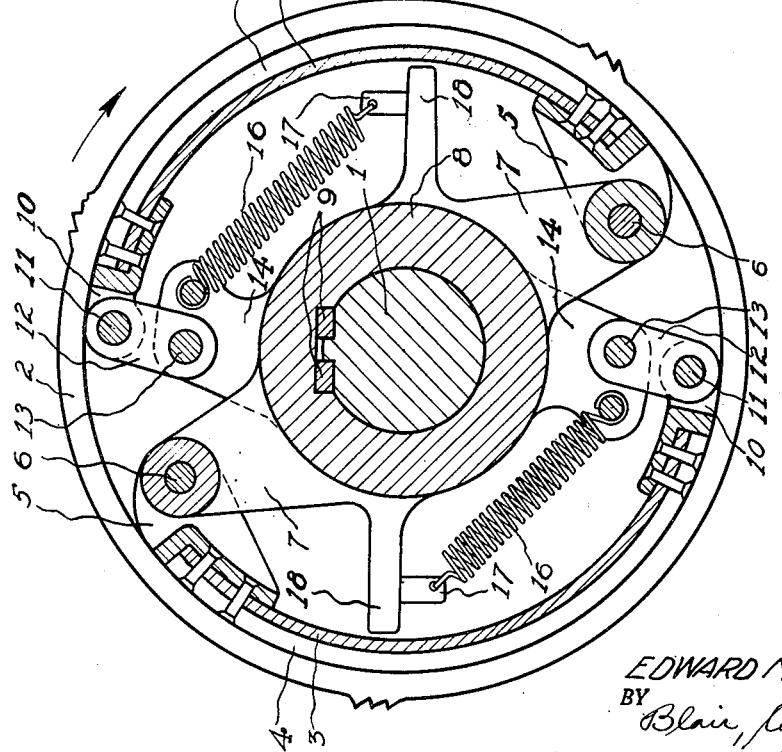
INVENTOR.
EDWARD M. FLORCYK
BY
Blair, Curtis + Dunne
ATTORNEYS.

Patented Sept. 20, 1938

2,130,486

UNITED STATES PATENT OFFICE 2,130,486

CLUTCH MECHANISM

Edward M. Florcyk, Rockaway, N. J., assignor to Stapling Machines Co., a corporation of Delaware Application March 11, 1935, Serial No. 10,440

11 Claims. (Cl. 192—26)

This invention relates to clutch mechanisms and controls therefor and particularly to a clutch mechanism for engaging and disengaging a driven shaft with a high degree of frequency.

It is an object of the invention to provide an efficient and durable clutch of the character described.

It is a further object to provide a clutch having a high mechanical efficiency of clutch elements whereby a minimum force is required to produce an almost instantaneous clutching engagement between the driving and driven elements.

It is a further object to provide a clutch mechanism in which the driving connection is made and broken through a toggle joint actuated by a comparatively small force.

It is a further object to provide a clutch control mechanism for quickly throwing the clutch elements into and out of clutching engagement.

It is a further object to provide a clutch mechanism which is operable by a minimum force and movement of clutch members and which engages and disengages within smaller limits of time than has been practicable heretofore.

It is a further object to provide a clutch mechanism in which stresses on the clutching parts are reduced, unit pressures are controlled, and which has improved inherent capacity to dissipate heat.

Other objects will be in part obvious and in part pointed out hereinafter.

One illustrative embodiment of the invention is shown in the accompanying drawings, in which:—

Figure 1 is a front elevation of a clutch mechanism and control therefor embodying the invention and in which the parts are shown in clutching engagement with the control mechanism in position to break the engagement.

Fig. 2 is the same as Fig. 1 but showing the position of the parts just after the clutching engagement has been broken.

Fig. 3 is a vertical section through the clutch elements (taken on the line 3—3 of Fig. 4) and showing the position of the parts in full clutching engagement.

Fig. 4 is a vertical section taken on the line 4—4 of Fig. 3.

Fig. 5 is the same as Fig. 3 but showing the position of the parts at the start of a clutching engagement.

Fig. 6 is the same as Fig. 5 but showing the parts in disengaged position.

Figure 9:
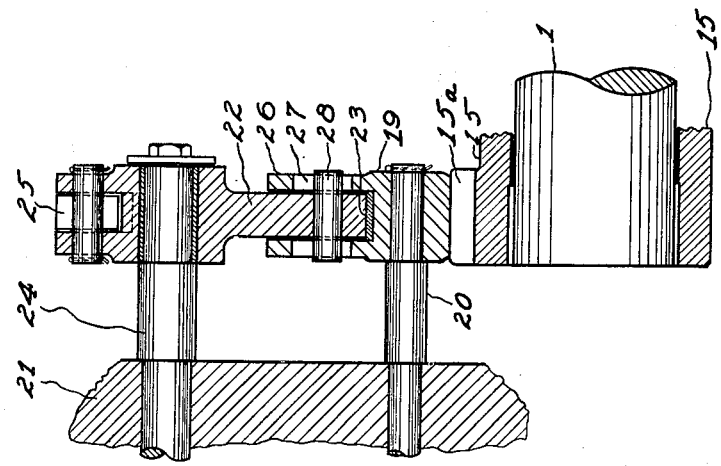
Fig. 9 is a section taken on the line 9—9 of Fig. 8.

Referring to Fig. 1, the illustrative clutch mechanism is shown associated with a work or driven shaft 1 and a rotating drum 2 of a drive pulley (the rest of the pulley being omitted for clearness of illustration). Drum 2 rotates in the direction of the arrow and when clutched to work shaft 1 rotates said shaft in the same direction.

For clutching drum 2 to work shaft 1, one or more (two in the illustrative embodiment) clutch band segments 3 are provided. Each band segment is preferably made of semi-flexible steel and is provided at its upper surface with a friction band 4 preferably of woven material to engage the drum 2 when pressed thereagainst.

Referring to Fig. 5, one end of each band segment 3 is riveted to an anchor lug 5 which is pivotally connected by means of a pin 6 to an arm 7 carried by a collar 8 keyed to work shaft 1 preferably by duplex key members 9.

The other end of each band segment 3 is riveted to an anchor lug 10 pivotally connected by a pin 11 to a toggle link 12, the other end of which is pivotally connected by means of a pin 13 to an arm 14 carried by a collar 15 rotatably mounted on a hub 8a of collar 8 (see Fig. 4).

Referring to Figs. 1 and 2, the arrangement is such that when toggle links 12 are in the extended position shown in Fig. 1 the band segments 3 are pressed into clutching engagement with drum 2 and rotating movement is imparted to work shaft 1 through arms 7 and collar 8 keyed to work shaft 1. When, however, toggle links 12 are retracted to the angular position shown in Fig. 2, band segments 3 are drawn away from drum 2 and no rotating movement is imparted to work shaft 1.

Each toggle link 12 is normally held in the extended position shown in Fig. 1 by means of a spring 16 secured at one end to the arm 14 and at the other end to an anchor pin 17 carried by an extension 18 of arm 7. Thus, as shown in Fig. 1, springs 16 normally hold toggle links 12 in extended position and normally press band segments 3 into clutching contact with drum 2 to cause work shaft 1 to rotate with drum 2.

To disengage the clutch, control mechanism is provided to arrest rotation of collar 15 and arms 14, thus causing band segments 3 moving in the direction of the arrow in Fig. 1 to swing toggle links 12 to the retracted position shown in Fig. 2 and draw band segments 3 inwardly and away from drum 2.

Figure 8:
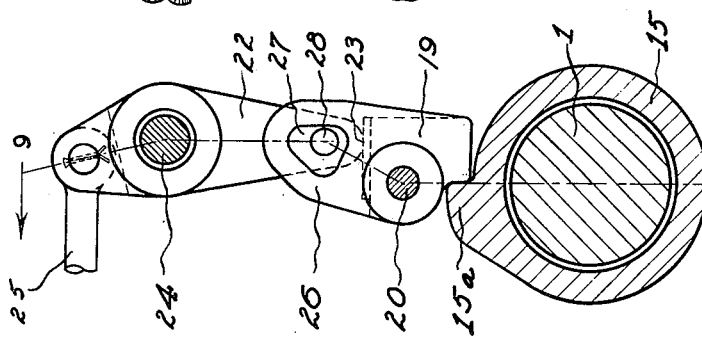
Fig. 8 is the same as Fig. 7 but showing the control mechanism in a position to disengage the clutch.
Figure 7:
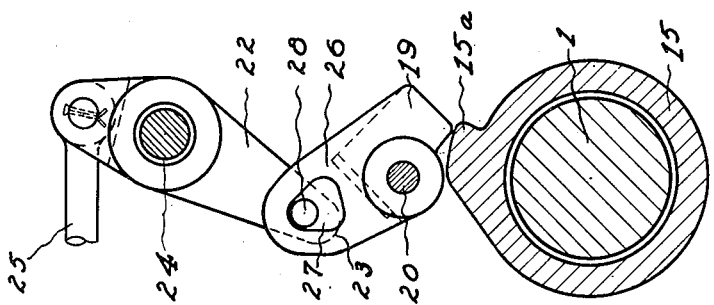
Fig. 7 is a front elevation of the clutch control mechanism in its relationship to the driven shaft during a clutching engagement.

As best shown in Figs. 7, 8 and 9, the clutch control mechanism consists of a trigger 19 mounted to pivot on a pin 20 extending from the framework 21 on any machine to which the clutch is applied.

Trigger 19 is normally held in the path of rotation of a lug 15a formed on collar 15, as shown in Fig. 8. The trigger 19 is held in such position by a rocking lever 22, the lower end 23 of which (when in the position shown in Fig. 8) engages the top of trigger 19 and holds it against pivotal movement.

Lever 22 is mounted to rock on a pin 24 extending from the framework 21 and its rocking movement is controlled by a link 25 pivotally connected to the upper end of lever 22; said link being suitably connected to a foot pedal or handle for the operator of the machine.

As shown in Fig. 9, trigger 19 carries two spaced extensions 26 between which the lower end of lever 22 extends. Extensions 26 are provided with aligned slots 27 to receive the ends of a pin 28 carried by lever 22. Slots 27 are of such size and shape as to permit trigger 19 and lever 22 to be rocked from the position shown in Fig. 7 and to cause lever 22 when returned to the position shown in Fig. 8 to return trigger 19 to the position there shown.

The rocking movement of lever 22 and trigger 19 is so limited that when rocked to the position shown in Fig. 8 the lower end 23 of lever 22 will contact with the top of trigger 19 and hold it in the position there shown, i. e., in the path of rotation of lug 15a on collar 15, so that when lug 15a strikes trigger 19, further movement of collar 15 and arms 14 will be arrested and the clutch disengaged.

To effect a clutching engagement, lever 22 is moved by link 25 to the position shown in Fig. 7, thus releasing lug 15a and permitting springs 16 to move collar 15 and through arms 14 to straighten toggle links 12 and force the clutch bands 3 into clutching engagement with drum 2. The clutching engagement thus effected continues until lever 22 is moved by the operator to the position shown in Fig. 8.

It should be noted that when lug 15a strikes trigger 19, the force of the rotary motion of the lug 15a is transmitted to the lower end 23 of rocking lever 22, the axis of the lever action being coincident with the axis of pin 20, with the result that a turning force or torque is, by means of this trigger arrangement converted into a pushing force on lever 22, acting in a line which passes through the axis of pivot pin 24. This combination of conditions produces a desirable mechanical condition from the standpoint of arresting motion through a control lever, such as the lever 22 which has an oscillating or rocking motion, since there is no tendency to rock said lever at the time of impact of lug 15a against trigger 19. In the position shown in Fig. 1, the trigger is self-locking against any rotation. The instant this condition is effected, the band segments 3 start to disengage from contact with drum 2.

To promptly stop rotation of work shaft 1 when the clutch is disengaged, a suitable brake may be applied to work shaft 1 and automatically controlled to arrest motion of said shaft when the clutch is released.

It should be noted further that, unlike any clutch buffer or disengaging mechanism heretofore known, the present invention permits rapid disengagement of the clutch at high speeds. The moment lug 15a arrests movement of collar 15, toggle links 12 draw band segments 3 away from drum 2, thereby breaking the clutch connection. And when trigger 19 is withdrawn from lug 15a, the clutch is quickly engaged, the power of the springs 16 being sufficient to quickly overcome the inertia of collar 15 and force band segments 3 against drum 2, thus developing the initial friction required to transmit motion to work shaft 1. From this instant until the full load of work is developed, each clutch band or segment 3 which is of a semi-flexible nature, functions according to the law of wrapping friction, giving at the output end of the band more force than is produced by the steady pull of spring 16. This latter condition produces in effect a self-energizing clutch. The development of a large normal contact pressure for a relatively small spring effort, together with the action of the toggle links 12, contribute to the efficiency of the clutch for high speed operations.

The trigger action control mechanism also contributes to the efficiency of the clutch. The trigger is rocked out of the path of lug 15a. Hence as compared with any wiping or rubbing action of plunger contacts, appreciable advantages are gained.

The clutching mechanism of this invention is particularly advantageous for use in the operation of stapling machines adapted to staple wire to box parts or to staple box parts together. In such machines it is desirable to drive staples irregular distances apart, and this is done by clutch control of the stapling operations. A quick acting clutch contributes to correct staple positioning at high speed.

It is generally understood that the difference between power output and power input is the energy wasted as heat at the friction surfaces. Such waste of energy has been greatly reduced in the clutch mechanism of this invention. First, because the frictional drag has been greatly reduced; second, because the clutch segments are in effect self-energizing; and third, because the disengagement of the clutch elements is almost instantaneous and permits no drag, the bands or segments being freed from any contact with the driving drum the instant the toggle linkage is broken.

It will be understood that the invention is not to be limited to the specific embodiment shown for purposes of illustration as the inventive features may be variously embodied without departing from the invention.

While the illustrative embodiment shows a duplex clutching mechanism, it will be understood that a single band internal expanding clutch may be used or several band segments.

It will also be understood that all of the features of the invention need not be used conjointly as they may be used to advantage in various combinations as defined by the sub-joined claims.

The "rear end of the clutch band" means the rear end of the clutch band in its direction of movement with the drum, i. e., in a clockwise direction in Figs. 1 and 2.

I claim:

1. In combination with a driving drum and a driven shaft, clutch mechanism comprising a plurality of clutch band segments adapted to be thrust into clutching engagement with the drum, one end of each segment being secured to an arm carried by a collar fixed to the driven shaft and the other end of each segment being secured to a toggle link pivoted to an arm carried by a second collar rotatably mounted on a hub of the first collar, a spring connecting said arms and normally holding the toggle link in extended position to press the segments against the drum, a lug on the second collar, a pivoted trigger adapted to be moved into the path of rotation of said lug and to arrest rotation thereof, and means to control the pivoting movement of said trigger; said controlling means including a rocking lever adapted when rocked in one direction to engage the trigger, move it into the path of rotation of the lug and hold it there, and when rocked in the other direction to release the trigger and permit the lug to pivot the trigger out of the path of rotation of the lug.

2. In combination with a driving drum and a driven shaft, clutch mechanism comprising a plurality of clutch band segments adapted to be thrust into clutching engagement with the drum, one end of each segment being secured to a collar fixed to the driven shaft and the other end of each segment being secured to a toggle link pivoted to a second collar rotatably mounted on the first collar, spring means connecting said collars and normally holding the toggle link in extended position to press the segment against the drum, a lug on the second collar, a trigger adapted to be moved into the path of rotation of said lug and to arrest rotation thereof whereby the toggle links draw the segments away from the drum, and means to control the operation of the trigger.

3. In combination with a driving drum and a driven shaft, clutch mechanism comprising a clutch band adapted to be thrust into clutching engagement with the drum, one end of the band being secured to a collar fixed to the driven shaft and the other end of the band being secured to a toggle link pivoted to a second collar rotatably mounted on the first collar, spring means connecting said collars and normally holding the toggle link in extended position to press the band against the drum, a lug on the second collar, a trigger adapted to be moved into the path of rotation of said lug and to arrest rotation of the second collar whereby the toggle link draws the band away from the drum, and means to control the operations of the trigger.

4. In combination with a driving drum and a driven shaft, clutch mechanism comprising a plurality of clutch band segments, a clutch collar fixed to the driven shaft and secured to one end of each of the clutch band segments, a second clutch collar rotatably mounted on the first clutch collar, toggle links connecting the second clutch collar to each of the clutch band segments, spring means connecting the two collars and normally holding the toggle links in extended position to press the band segments into clutching engagement with the drum whereby the collars and driven shaft rotate with the drum, and means to arrest movement of the second collar whereby continued movement of the first collar will pull the toggle links and the band segments away from the drum.

5. In combination with a driving drum and a driven shaft, clutch mechanism comprising a plurality of clutch band segments, a clutch collar fixed to the driven shaft and secured to one end of each of the clutch band segments, a second clutch collar rotatably mounted on the first clutch collar, toggle links connecting the second clutch collar to each of the clutch band segments, spring means connecting the two collars and normally holding the toggle links in extended position to press the band segments into clutching engagement with the drum, and means for retracting the toggle links to release the pressure of the bands against the drum.

6. In combination with a driving drum and a driven shaft, clutch mechanism comprising a clutch band, a clutch collar fixed to the driven shaft and secured to one end of the clutch band, a second clutch collar rotatably mounted on the first clutch collar, a toggle link connecting the second collar to the other end of the clutch band, means connecting the two collars and normally holding the toggle link in extended position to press the band into clutching engagement with the drum, and means for retracting the toggle link to break the clutching engagement between the band and the drum.

7. In combination with a driving drum and a driven shaft, clutch mechanism comprising a plurality of flexible clutch band segments one end of each having a pivotal connection with the driven shaft, and controllable means to pivot said segments into and out of clutching engagement with said drum; said means including toggle linkage pivoted to the other end of each segment and mounted to rotate freely about the driven shaft, said linkage being adapted when in extended position to press the segments into clutching engagement with the drum and when in retracted position to withdraw the segments from clutching engagement with the drum, means normally holding said linkage in extended position, and means to move the linkage to a retracted position.

8. In combination with a driving drum and a driven shaft, clutch mechanism comprising a flexible clutch band one end of which has a pivotal connection with the driven shaft, and controllable means to pivot said band into and out of clutching engagement with said drum; said means including toggle linkage pivoted to the other end of the band and mounted to rotate freely about the driven shaft, said linkage being adapted when in extended position to press the band into clutching engagement with the drum and when in retracted position to withdraw the band from clutching engagement with the drum, means normally holding said linkage in extended position, and means to move the linkage to a retracted position.

9. In combination with a driving element and a driven element, clutch mechanism comprising a flexible clutch band one end of which is pivotally connected to the driven element, and means to pivot said band into and out of clutching engagement with the driving element; said means including toggle linkage pivoted to the other end of said band and rotatable about the driven element, means normally holding the toggle in extended position, and means to move the toggle to a retracted position.

10. In combination with a driving drum and a driven shaft, clutch mechanism comprising a flexible clutch band located within the driving drum and connected to the driven shaft adjacent the forward end of the clutch band, the portion of the clutch band extending rearwardly from said point of connection being free of attachment to the driven shaft, and toggle means operable adjacent the rear end of the clutch band to press the band at that point against the driving drum whereby movement of the driving drum will force the clutch band into clutching engagement with the driving drum between the point of application of the toggle pressure and the point of connection to the driven shaft.

11. In combination with a driving drum and a driven shaft, clutch mechanism comprising a flexible clutch band located within the driving drum and connected to the driven shaft adjacent the forward end of the clutch band, the portion of the clutch band extending rearwardly from said point of connection being free of attachment to the driven shaft, toggle means operable adjacent the rear end of the clutch band to press the band at that point against the driving drum whereby movement of the driving drum will force the clutch band into clutching engagement with the driving drum between the point of application of the toggle pressure and the point of connection to the driven shaft, and means to withdraw said toggle pressure to break the clutching engagement between the driving drum and the driven shaft.

EDWARD M. FLORCYK.